(12) United States Patent
Traynar

(10) Patent No.: US 11,361,124 B1
(45) Date of Patent: Jun. 14, 2022

(54) GENERATING A POWER PROFILE BY NODE SAMPLING AN IP BLOCK

(71) Applicant: Ansys, Inc., Canonsburg, PA (US)

(72) Inventor: Paul Traynar, Banbury (GB)

(73) Assignee: Ansys, Inc., Canonsburg, PA (US)

( * ) Notice: Subject to any disclaimer, the term of this patent is extended or adjusted under 35 U.S.C. 154(b) by 810 days.

(21) Appl. No.: 16/058,381

(22) Filed: Aug. 8, 2018

Related U.S. Application Data

(60) Provisional application No. 62/543,430, filed on Aug. 10, 2017.

(51) Int. Cl.
   *G06F 30/17* (2020.01)
   *G06F 30/30* (2020.01)
   *G06F 30/392* (2020.01)
   *G06F 119/06* (2020.01)

(52) U.S. Cl.
   CPC .............. *G06F 30/17* (2020.01); *G06F 30/30* (2020.01); *G06F 30/392* (2020.01); *G06F 2119/06* (2020.01)

(58) Field of Classification Search
   CPC ........ G06F 30/17; G06F 30/392; G06F 30/30; G06F 2119/06
   See application file for complete search history.

(56) References Cited

U.S. PATENT DOCUMENTS

| | | | | |
|---|---|---|---|---|
| 6,269,467 B1* | 7/2001 | Chang | ..................... | G06F 30/33 716/136 |
| 6,397,170 B1* | 5/2002 | Dean | ..................... | G06F 30/327 716/136 |
| 7,337,100 B1* | 2/2008 | Hutton | ..................... | G06F 30/39 716/108 |
| 7,877,710 B1* | 1/2011 | Neto | ..................... | G06F 30/30 716/132 |
| 7,941,680 B2* | 5/2011 | Chaudhry | ............... | G06F 30/20 713/320 |
| 8,010,931 B1* | 8/2011 | French | ..................... | G06F 30/34 716/135 |
| 8,863,052 B1* | 10/2014 | Dhuria | ................. | G06F 30/367 716/108 |
| 9,292,648 B1* | 3/2016 | Chandra | ............... | G06F 30/394 |
| 9,424,381 B2* | 8/2016 | Dhanwada | ............ | G06F 30/367 |
| 9,529,946 B1* | 12/2016 | Schumacher | ....... | G06F 11/3062 |
| 11,036,905 B1* | 6/2021 | Joseph | ................. | G06F 30/327 |
| 2002/0073380 A1* | 6/2002 | Cooke | ..................... | G06F 30/30 716/102 |

(Continued)

*Primary Examiner* — Iftekhar A Khan
(74) *Attorney, Agent, or Firm* — Jones Day

(57) ABSTRACT

A power profile for an electronics design is implemented by accessing a unit descriptive of an electronic design comprising a first intellectual property (IP) block expressed in a simulation language and comprising a netlist. A total number (NT) of net weights are identified in the netlist, wherein each respective net weight is proportional to an effective load capacitance of an associated net. A total number (NP) of populated nets having associated toggle simulation data are identified in the netlist. A ratio (KS) equal to a sum of all NT net weights divided by a sum of all NP populated net weights is generated. A sample energy (ES) is generated based on the associated toggle simulation data of and net weights for each of the NP populated nets. And a block power profile is modelled based on an estimated block energy (EN) equal to KS multiplied by ES.

21 Claims, 9 Drawing Sheets

(56) References Cited

U.S. PATENT DOCUMENTS

| | | | | |
|---|---|---|---|---|
| 2009/0271167 A1* | 10/2009 | Zhu | ............... | G06F 30/331 |
| | | | | 703/14 |
| 2010/0180240 A1* | 7/2010 | Davis | ............ | G06F 30/3312 |
| | | | | 716/132 |
| 2012/0131523 A1* | 5/2012 | Lu | ............... | G06F 30/33 |
| | | | | 716/102 |
| 2013/0167098 A1* | 6/2013 | Fennell | ............ | G06F 30/331 |
| | | | | 716/112 |
| 2014/0143557 A1* | 5/2014 | Kuesel | ............ | H04L 12/10 |
| | | | | 713/300 |
| 2014/0143558 A1* | 5/2014 | Kuesel | ............ | G06F 1/26 |
| | | | | 713/300 |
| 2016/0217245 A1* | 7/2016 | Gregerson | ......... | G06F 30/3312 |
| 2017/0004234 A1* | 1/2017 | Dhanwada | ............ | G06F 30/20 |
| 2017/0300604 A1* | 10/2017 | Shehata | ............ | G06F 30/367 |
| 2018/0210990 A1* | 7/2018 | Dhanwada | ............ | G06F 30/367 |
| 2021/0209277 A1* | 7/2021 | Joseph | ............ | G06F 30/327 |

* cited by examiner

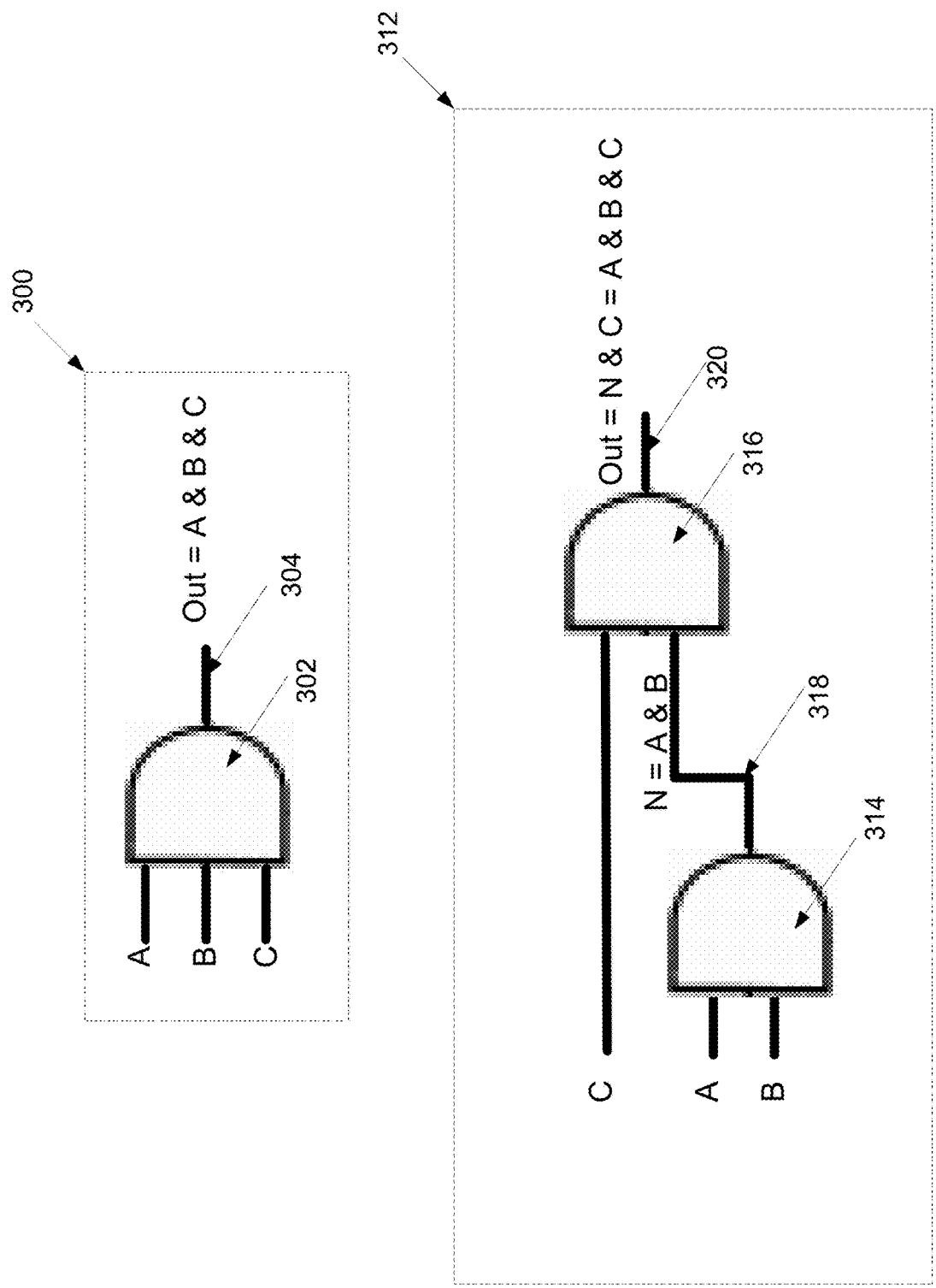

GENERATING A POWER PROFILE BY NODE SAMPLING AN IP BLOCK

CROSS-REFERENCE TO RELATED APPLICATIONS

This application claims priority to U.S. Provisional Application No. 62/543,430, filed Aug. 10, 2017, entitled "Generating a Power Profile by Node Sampling An IP Block," which is incorporated herein by reference.

TECHNICAL FIELD

The subject matter described herein relates to electronics design, and more particularly to modeling electronic circuit design behavior to generate a power profile reflective of a power profile of a physical embodiment of an electronic design.

BACKGROUND

In the field of circuit design behavior modeling, electronic component designs may comprise a collection of blocks of intellectual property (IP). Blocks of IP comprise various forms, non-limiting examples of which include system level descriptions, gate level representations, register transfer level (RTL), meshes, or netlists. These blocks of IP may describe different aspects of an electronic device under design or test. For example, blocks of IP may describe the toggle logic embodied in the logic gate networks of a digital component, the physical components that make up a physical device, the power expended by an electronic circuit, or the output behavior of individual components of a circuit.

Depending on the software tools employed to create models and simulate their behavior, and the aspects of an electronic component being modeled, blocks of IP may be expressed in different forms, for example in hardware description language ("HDL") or as vectors. For example, blocks of IP may include a description of an electronic circuit at a register transfer logic level of abstraction expressed in IEEE 1364, a standardized hardware description language. Register transfer logic is often used to express a physical electronic components in the design and verification of digital circuits, analog circuits, and mixed signal circuits. Hardware description languages, like IEEE 1364 can be used to describe a synchronous digital circuit in terms of the flow of digital signals between hardware registers and the logical operation performed on those signals. In another example, a block of IP may comprise a netlist that may describe a digital circuit as a netlist describing a set of electronic components in a circuit in terms of the nodes they are connected to. A block of IP has the benefit of being reusable by defining the inputs and outputs, the same reusable block of IP can be ported between circuits as needed, thereby simplifying the design process. A block of IP may also comprise a collection of component blocks of IP, each having the same or different expressions for describing different aspects of a device under design or verification. A collection of blocks of IP may together with other describe a unit, or an electronic circuit, such as a system on a chip among other things.

SUMMARY

A computer implemented method for implementing a power profile for an electronics design is disclosed. The computer-implemented method may comprise accessing a unit descriptive of an electronic design, said unit comprising a first intellectual property (IP) block expressed in a simulation language, the first IP block comprising a netlist. A total number ($N_T$) of net weights in the netlist are identified. Each respective net weight is proportional to an effective load capacitance of an associated net. A total number ($N_P$) of populated nets in the netlist are identified, where the $N_P$ populated nets are each associated with a net having associated toggle simulation data, such that $N_E = N_T - N_P$ empty nets are associated with no toggle simulation data and each of the $N_P$ populated nets is associated with one of the $N_T$ net weights. A ratio ($K_S$) equal to a sum of all $N_T$ net weights divided by a sum of all $N_P$ populated net weights is generated. And, based on the associated toggle simulation data of each of the $N_P$ populated nets and further based on the net weights associated with each of the $N_P$ populated nets a sample energy ($E_S$) is generated, and a block power profile based on an estimated block energy ($E_N$) equal to $K_S$ multiplied by $E_S$ is modeled.

In an interrelated aspect, a computer program product for implementing a power profile for an electronics design is disclosed. The computer program product comprises one or more non-transitory computer readable storage media and program instructions stored on the one or more non-transitory computer readable storage media, said program instructions comprising instructions to access a unit descriptive of an electronic design, said unit comprising a first intellectual property (IP) block expressed in a simulation language, the first IP block comprising a netlist. The program instructions cause a total number ($N_T$) of net weights in the netlist to be identified. Each respective net weight is proportional to an effective load capacitance of an associated net. The program instructions cause a total number ($N_P$) of populated nets in the netlist to be identified, where the $N_P$ populated nets are each associated with a net having associated toggle simulation data, such that $N_E = N_T - N_P$ empty nets are associated with no toggle simulation data and each of the $N_P$ populated nets is associated with one of the $N_T$ net weights. The program instructions cause a ratio ($K_S$) equal to a sum of all $N_T$ net weights divided by a sum of all $N_P$ populated net weights to be generated. And, based on the associated toggle simulation data of each of the $N_P$ populated nets and further based on the net weights associated with each of the $N_P$ populated nets, he program instructions cause a sample energy ($E_S$) is generated, and a block power profile based on an estimated block energy ($E_N$) equal to $K_S$ multiplied by $E_S$ to modeled.

In an interrelated aspect, a system for implementing a power profile for an electronics design is disclosed. The system comprises at least one processor including one or more processor cores executing on or more threads in a computing system and a non-transitory computer accessible storage medium storing thereupon program code that includes a sequence of instructions that, when executed by the at least one processor, causes the at least one processor at least to access a unit descriptive of an electronic design, said unit comprising a first intellectual property (IP) block expressed in a simulation language, the first IP block comprising a netlist. A total number ($N_T$) of net weights in the netlist are identified by the system. Each respective net weight is proportional to an effective load capacitance of an associated net by a processor executing the instructions. A total number ($N_P$) of populated nets in the netlist are identified, where the $N_P$ populated nets are each associated with a net having associated toggle simulation data, such that $N_E = N_T - N_P$ empty nets are associated with no toggle simulation data and each of the $N_P$ populated nets is associated with one of the $N_T$ net weights. A ratio ($K_S$) equal to a sum of all $N_T$ net weights divided by a sum of all $N_P$ populated net weights is generated by a processor executing the instructions. And, based on the associated toggle simulation data of each of the $N_P$ populated nets and further based on the net weights associated with each of the $N_P$ populated nets a sample energy ($E_S$) is generated, and a block power profile based on an estimated block energy ($E_N$) equal to $K_S$ multiplied by $E_S$ is modeled a processor executing the instructions.

The subject matter described herein provides many technical advantages. As described below, the computer-based techniques of the present disclosure improve the functioning of a computer system as compared to conventional approaches because the techniques described herein enable power profile generation and power modeling of electronic circuit designs in a manner that is more accurate and/or more efficient (e.g., faster, with smaller memory and processing requirements) as versus the conventional approaches. The computer-based techniques achieve such improvements while alleviating the need for expensive and time consuming electronic circuit simulations and event propagation. This is enabled by employing weight values to represent the energy expended by toggling logic gates within the circuit design and accumulating weighted toggles with each clock cycle. Further, the techniques of the present disclosure provide robust results even when substantial logic data is missing from a model. The use of the disclosed sampling techniques allow circuit modeling and power profile generation to be performed more accurately and/or more efficiently than the conventional approaches. Through the techniques described below, it is possible to improve the performance of physical electronic devices by accurately modeling and measuring a physical devices behavior. Then using those measurements of modeled behavior, a system or circuit designer is empowered to optimize one or more physical components of the device. These technical advantages and others of the present disclosure are described in detail below.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

FIG. 3a illustrates the distinctions between empty nets.

DETAILED DESCRIPTION

Figure 1:
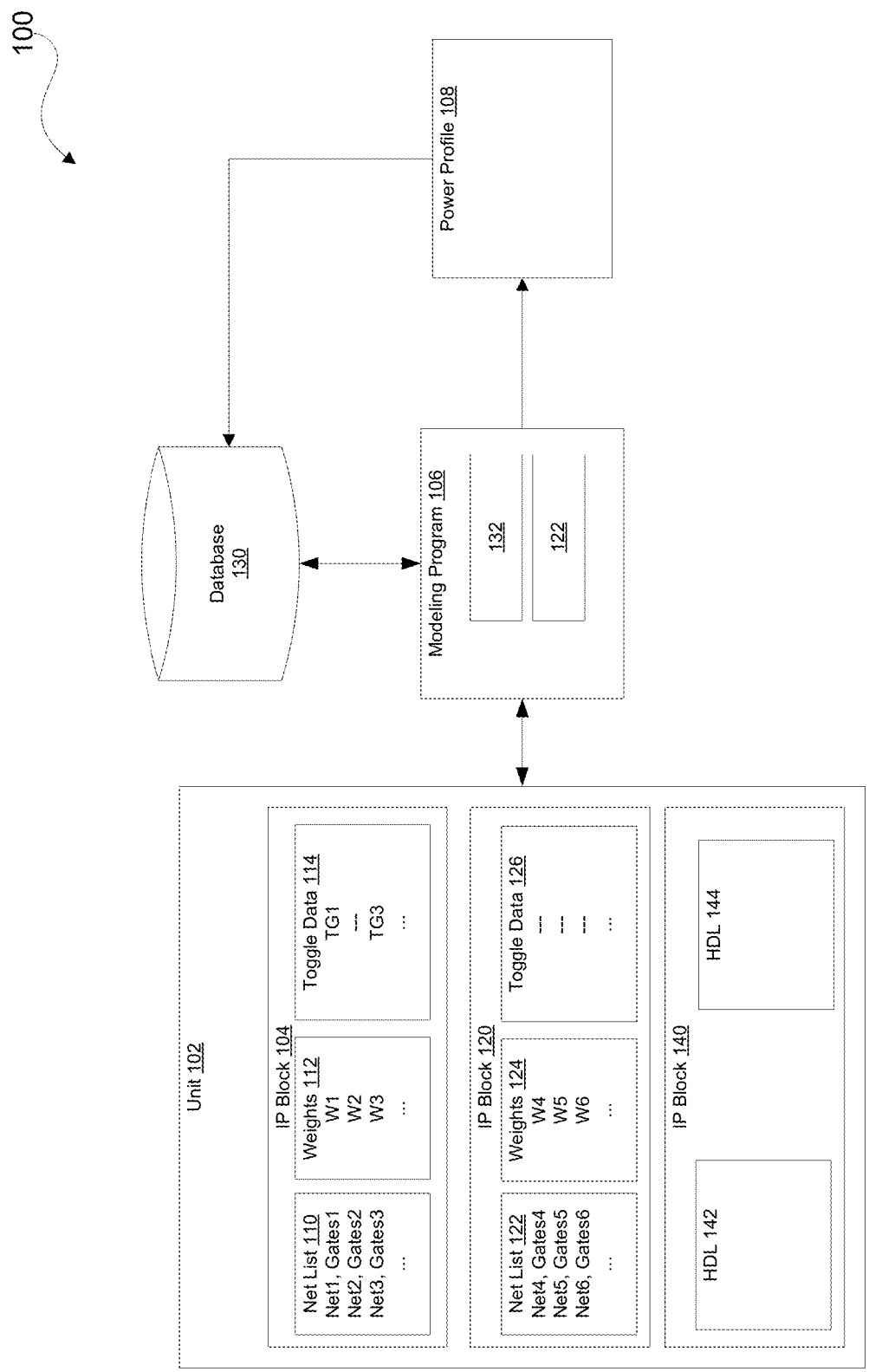
FIG. 1 depicts an exemplary functional flow diagram of a data flow in a system in accordance with the present disclosure.

In modeling a circuit design based on blocks of IP it may be the case that certain blocks of IP may not include all of the requisite data to conduct a desired test or simulation. For example, a block of IP may be generated with a particular purpose of modeling logic toggles, but toggle simulation data, or simply toggle data, may only be provided for particular nets within the block of IP while many nets may lack any toggle simulation data. To accurately model the power expended by an electronic circuit, it is necessary to consider that any given state of such an electronic circuit may have an substantially different power profile than another state of the electronic circuit. In other words, a block of IP describing a portion of an electronic circuit may describe several power modes that a device may have. These modes can result when one or more input nets enable or disable downstream components in a manner that gives rise to different characterizations. In practice identifying these modes involves simulating the logic of a circuit. For example an HDL simulator, such as Verilog simulator, may generate an internal netlist describing all the nets that interconnect the logic gates, allowing a designer to designate selected nets as observed nets, after which the simulator simulates the Boolean logic described by the Verilog file and generates certain outputs that describe the logic carried on one or more observed nets.

Thus, current approaches to generating a power profile for electronic circuits require extensive simulation, data gathering, and post processing in order to accurately characterize the power mode in each potential state. This is an expensive and time consuming process, which may be required when an accurate power profile is desired after various changes are made to components of the circuit. But, in the normal course of unit, or circuit, design, designers are often running simulations on various components within a block of IP, or across multiple blocks of IP within such a unit, thereby generating partial simulation data for observed nets or components within a block of IP.

When these partial simulations generate toggle data on one or more particular nets, the simulation may accept a set of inputs from which it generates the logic state carried on a particular net as a result of the combination of logic between the input and the particular observed nets. During design simulations, it may be the case that a designer will only configure the simulator to observe selected nets within a netlist or selected nets within a collection of netlists. The simulator accepts the netlist(s) and inputs and then generates toggle data for each observed net based on the combination of logic that drives the gate that toggles a particular net, and thereby determines the values that would be carried by an electric waveform in a physical embodiment of the observed net as the block transitions from state to state. But, for each net that a designer designates as an observed net, the cost of the simulation as a function of time and processing power, increases. Therefore, the various nets that may interconnect the logic gates that determine the values on observed nets are simulated by the logic of the gates, but the output will not include toggle data for each of these overlooked simulated nets. Post processing to propagate logic behavior to these unobserved nets is also costly.

It is also a case that a portion of a block of IP describing a particular block may describe the logic function itself, while omitting an expression describing the internal nets and gates within a logic function. For example, the Boolean function A & B & C could be implemented with a three input AND gate. But if a manufacturer only provides two input AND gates this logical function would have to be implemented with two, two input AND gates. Thus the Boolean function A&B&C ignores the fact that physical realization may be a combination of two gates interconnected with a physical line or other interconnection. Thus in a physical implementation of A&B&C there may be a first two input AND gate having A and B as inputs, and a trace or other interconnection that connects the output N=A&B, to an input of a second two input AND gate having a second input C. Thus the implementation of the Boolean function A&B&C has an output equal to N&C=A&B&C and an internal inferred net that carries N=A&B to the output gate. These inferred nets will likely not be monitored by a system designer, especially where the netlist or associated Verilog may instantiate such a gate using an expression that omits the internal inferred net. And generating toggle data for this inferred net during post-processing is a costly and time consuming process.

During system design processes, simulations are often run to test or verify various aspects of a unit. The output of these simulations is often stored in a database for further post processing. Therefore, it is desirable to have a power profiling tool that accurately profiles the power of a physical device, that may have multiple power modes, using simulation data that may only describe portions of a block of IP, or portions of multiple blocks of IP. But, when performing a power analysis to generate a power profile of the electronic circuit design, missing simulation data may strongly impact the accuracy of the resulting profile. This is because without toggle simulation data for every net, the power expended on those nets lacking such simulation data is not accurately accounted for. Nets that lack simulation data may be, for example, overlooked nets or inferred nets as described above. Typical methods of addressing this problem involve performing event/activity propagation to create toggle simulation data for each net, but this is an expensive solution on a per clock cycle basis as mentioned above.

One method of estimating the power of an electronic circuit design is to estimate the power consumption from a small subset of nets within a block of IP, such as the inputs and selected outputs. But, attempts at accurately estimating power consumption in such blocks of IP in such a manner generally suffer from a common drawback as described above—that many blocks of IP include multiple power modes controlled by one or more input nets. Identifying these controlling nets, and characterizing the power profile of a block of IP that is dependent on the states of the controlling inputs, generally requires post-processing and data gathering in addition to expensive simulation to achieve accurate results.

An accurate technique called node sampling, or net sampling, recognizes that a block of IP containing a netlist of N nets, each in a particular state, can be expressed as a set of vector $x^i$, and the energy associated with such a block of IP undergoing a transition from $x^i$ to $x^f$ is $e(x^i,x^f)$. In terms of individual nets this can be expressed as:

$$E_N = \sum_{j=1}^{N} e_j(x^i, x^f)$$

where N is the number of nets in the netlist.

Similarly, the energy associated with a number of a sub-set, or sampling, of nets in the netlist would be $$E_S = \sum_{j=1}^{S} e_j(x^i, x^f)$$

where S is the number of sample nets in the sub-set of nets in the netlist.

Experimental observations have shown that:

$$\frac{E_N}{E_S}(x^i, x^f) \approx K_S \propto \frac{C_N}{C_S}$$

CN is proportional to the effective load capacitance of each of the $N_T$ total nets and CS is proportional to the load capacitance of the S sample nets.

That is, the ratio of $E_N$ to $E_S$ in any transition from $x^i$ to $x^f$ is approximately a constant $K_S$ that is itself proportional to a ratio of $C_N$, a net weight proportional to the load capacitance of all the N nets associated with $E_N$, and $C_S$, a net weight proportional to the load capacitance of all the S nets associated with $E_S$. Thus, an estimate of the total power of a block of IP is:

$$E_N = E_S * K_S$$

recognizing that $E_S$ may be accurately obtained based on toggle simulation data associated with each net.

Based on this observation, a power profile can be accurately generated for a block of IP containing N nets even if $N-S=N_E$ empty nets have no associated toggle simulation data. This is accomplished by selecting S populated nets from the block of IP, that is S nets that have associated toggle simulation data, and generating $E_S$ as the energy associated with the toggling of these S populated nets according to each of the S nets' toggle simulation data. In this way, an accurate approximate measurement of $E_N$ is obtained without requiring expensive and time consuming techniques to measure the energy expenditure for nets that have no associated toggle simulation data. With $E_N$ an accurate power profile may be generated for the associated block of IP.

FIG. 1 illustrates a functional flow diagram 100 illustrating the flow of data in a system capable of generating a power profile 108 based on the principals set forth in this Detailed Description. In embodiments, a unit 102 is an expression of a physical electronic device for the purposes of computer modeling and simulation. Unit 102 may include various blocks of IP, each of which may be stored together in a singular file, or each of which may be generated and stored independently of each other as various files or database records within one or more persistent data storage systems. Unit 102 may be used to design and verify a physical electronic component. Unit 102 comprises a first IP block 104 and a second IP block 120.

The first IP block 104 includes a netlist 110 that includes Net1, Net2, Net3, and so on. Each net (Net1, Net2, Net3, . . . ) may include a description of either an input, a toggling gate, at least one net line, and one or more toggled gates. Such a description may be expressed in a simulation language such as HDL, VDHL or Verilog, or any suitable form of expression including standard representations, a proprietary representations, vectors, data structures, or database records defined by a schema or other hierarchical structure. For example, unit 102 may have blocks of IP such as IP block 140 that includes one or more HDL files, e.g. 142, 144, that include expressions of portions of the physical device embodying unit 102. The netlist may be generated based on an HDL description of unit 102, for example HDL 142. For the purpose of power profiling each netlist 110, 122 is associated with a set of weights 112, 124, such that each net (Net1, Net2, Net3, . . . ) is associated with one or more respective weights, or net weights, 112, W1, W2, W3 and so on. In embodiments, W1, W2, W3 each include at least one weight that is associated with a capacitance, such as the effective load capacitance, of the associated net. These weights may be predetermined and stored in an accessible data store, or these weights may also be generated based on any suitable expression of the unit, or of the block of IP. In embodiments each weight is associated with the effective load capacitance of the associated net. Each net in netlist 110 may also have associated toggle simulation data, for example Net1 of netlist 110 is associated with toggle simulation data TD1, and Net3 of netlist 110 is associated with toggle simulation data TD3. A net, for example Net2 of Netlist 110, may be an empty net meaning that it has no associated toggle simulation data, a case represented in FIG. 1 by "---".

In embodiments, this simulation data may be generated by simulating the toggles that occur on one or more nets prior to power profiling. Netlists 110, 122, the weights 112, 124, and the simulating toggle data 114, 126 can be generated during a pre-processing step prior to power profiling. Or, each component of the blocks of IP 104, 120 may be obtained directly from a file or a database where the netlists 110, 122, the weights 112, 124, and the simulating toggle data 114, 126 had been previously stored. In other embodiments a block of IP, such as 104, may be stored in disparate locations such that netlist 110 may be reside in a file stored in a standard OS file structure, while weights 112 may be stored in a database comprising physical attributes of various physical components, and toggle data 114 may be stored in a separate database for warehousing simulation data.

In some cases, an IP block in a unit will include a netlist for which no listed nets have associated toggle simulation data. For example, unit 102 includes IP Block 120 which includes Net4, Net5, Net6, . . . , each having weights W4, W5, W6, but no associated toggle simulation data. That is each net in netlist 122 is an empty net. This may be because no simulations have previously been performed on IP block 120.

In embodiments, a unit 102 is described in one or more suitable machine readable formats, such that it may be stored and manipulated by a computer processing device. Unit 102 is accessed by a modeling program 106. Modeling program 106 may access unit 102 by retrieving unit 102 from a file, or a database, e.g. 130, or by receiving it from another computer process that sends unit 102 to modeling program 106. One will appreciate that modeling program 106 can access unit 102 in any suitable manner. Modeling program 106 may include multiple analysis modules 132, 122, or it may only include a power profiling module 122. Power profiling module 122 is configured to perform a net sampling technique as described herein in order to generate power profile 108 based on IP Block 104, IP Block 120, or both IP Block 104 and 120. In each case, the power profile 108 may be stored in a data repository, such as database 130. Because each IP block may be a reusable block, storing the power profile for an individual IP block may simplify later analysis relying on the same IP Block. Similarly, the power profile of the entire unit 102 may be stored in database 130, insofar as unit 102 itself is a reusable block, it too may be relied upon in later analysis that rely on the same unit 102.

In other embodiments, not illustrated, netlist 110 may not include specific data associated with nets (Net1, Net2, Net3, . . . ) within the netlist 110. Instead, a data storage like database 130 may store one or more component data elements of IP block 104, such that upon accessing unit 102, modeling program 106 retrieves the component netlist 110 and the associated net descriptions, weights 112, and toggle simulation data 114. Database 130 may also include a library of physical devices and manufacturer parts along with the physical characteristics and modeling data. In embodiments, the database 130 may be a single database or multiple databases.

In embodiments, a block of IP may include a gate level representation, in which case physical information about the instantiated gates can be obtained directly from a device library. In other embodiments, a block of IP such as IP Block 140 may describe the logic of a circuit at in the form of logic expressions such as HDL 132 and 144 without physical device data. In such cases, one or more modeling program 106 modules, e.g. module 132, is capable of compiling additional information about unit 102 by parsing the expression to generate additional blocks of IP. For example, module 132 may receive HDL 142, 144 of IP block 140 and in turn generate netlists 110 and 122. Module 132 may further parse the expression in HDL 142, 144 to obtain equivalent arrangements of component parts, such as logic gates, and other electronic components, that in a physical embodiment of unit 102 perform the functions defined by IP Block 140. Module 132 may then obtain the physical data describing those logic gates and other physical components from a library of physical devices stored in database 130 in order to generate the net weights, e.g. 112 or 124, associated with each net of a netlist, e.g. 110 or 122.

Figure 2:
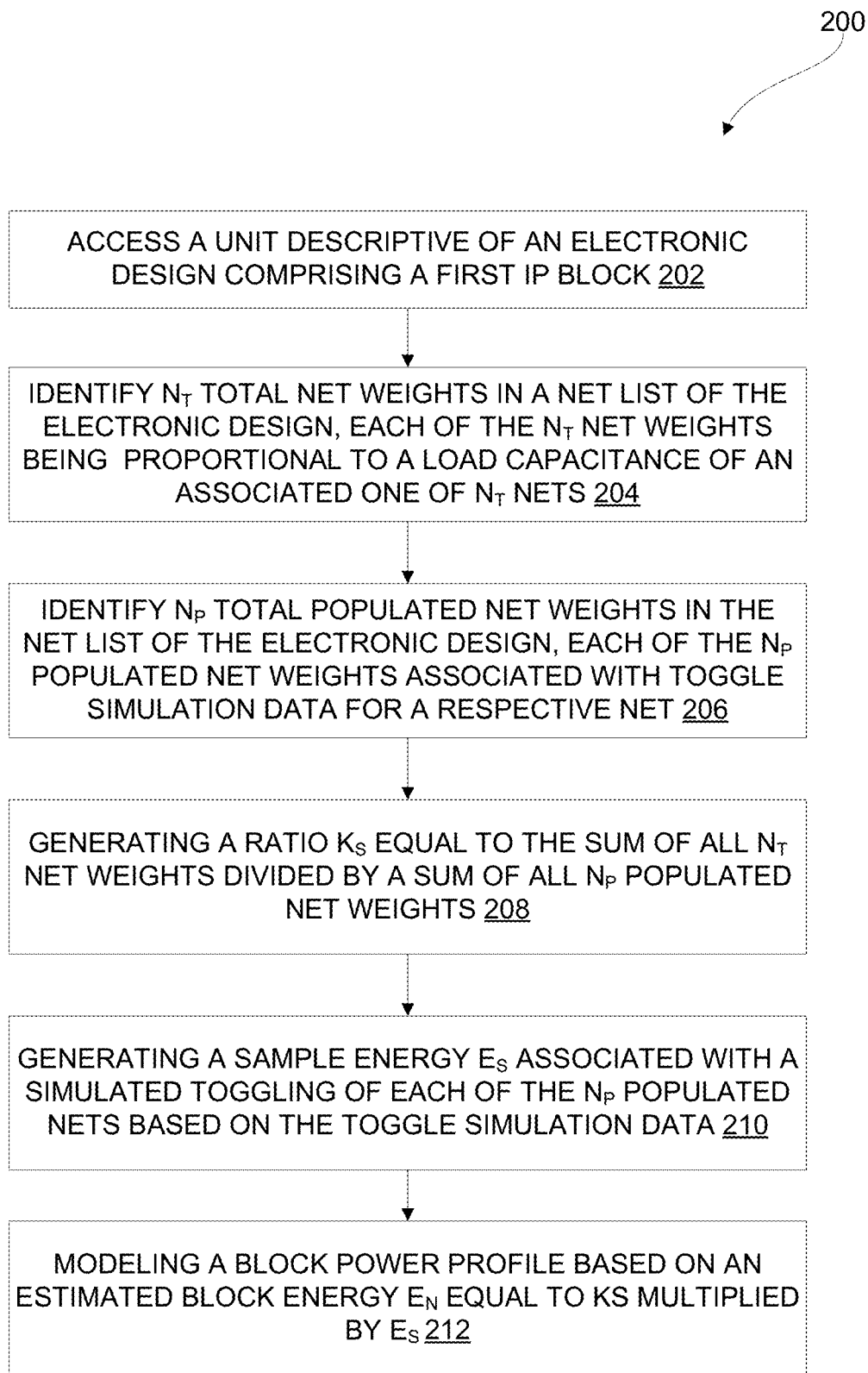
FIG. 2 is a flow chart depicting operations of an example method for generating a power profile of an electronics design in accordance with embodiments of the present disclosure.

FIG. 2 illustrates a flowchart 200 depicting operations of an example method for generating a power profile for a block of IP describing an electronic device design. At operation 202, a unit descriptive of an electronic device design comprising a first IP block is accessed. The first IP block may be IP block 104, and the unit descriptive of an electronic design may be unit 102. The operations illustrated in FIG. 2, according to some embodiments, are carried out by modeling program 106, performing power profile analysis 122. At operation 204, a total number of net weights in a netlist of the electronic design are identified. For example, the electronic design may be IP block 104, and analysis 122 may identify Net1, Net2, Net3, and so on of netlist 110, wherein each of Net1, Net2, and Net3 have an associated weight, W1, W2, W3 that is proportional to a load capacitance of respective net. Then at operation 206, a total number of populated net weights in the netlist of the electronic design is determined. In the example illustrated in FIG. 1, netlist 110 includes two illustrated nets (Net1 and Net3) having associated toggle simulation data (TD1, TD3). Thus, Net1 and Net3 in the embodiments illustrated by FIG. 1 are populated nets, and Net2 is an empty net, which as used herein is a net having no associated toggle simulation data, or toggle data. Operations 204 and 206 may include querying a database or accessing a distinct file to identify associated weights and toggle data.

Next, a ratio is generated, at 208, equal to the sum of all the net weights in the IP block divided by a sum of all the populated net weights. Thus, for IP block 104, the ratio is generated by analysis module 122 as (W1+W2+W3)/(W1+W2), for (W1, W2, W3) proportional to the effective load capacitance of each of Net1, Net2, and Net3 of netlist 110.

Then at 210, a sample energy is generated by simulating the toggling of populated nets based on each nets' associated toggle simulation data. For example, a sample energy is calculated for Net1 and Net2, of netlist 110 in IP block 104 based on the toggle simulation data associated with each net TD1 and TD3. Finally, a block power profile is accurately estimated at 212 based on the ratio, i.e. $K_S \propto C_N/C_S$, generated in step 208 multiplied by the sample energy generated at step 210, i.e. $E_S*K_S$. This block power profile may for example be power profile 108 illustrated in FIG. 1.

FIG. 3a illustrates the distinctions between empty nets, such as inferred nets and overlooked nets, and populated nets. The logic network 300 includes a three input AND gate 302, with inputs A, B, and C, and an output 304 that represents an electronic waveform carrying a logical value of A&B&C. For the purposes of simulating testing and verifying logical output values on output 304, the information illustrated in logic network 300 may be sufficient. But, for the purposes of generating a accurate power profile of the physical circuit, one must account for the internal nets as shown in network 312. Network 312 describes the same logic as the network 300, likewise having three inputs A, B, and C and an output 320 carrying the logical value of A&B&C. But network 312 includes a description of the implementation of the three input AND gate 302, which for example includes two input AND gates 314 and 316 interconnected by net 318. Thus in this example, whereas network 300 describes four nets carrying A, B, C, and A&B&C; network 312 correctly describes five nets carrying A, B, N=A&B, C, and N&C=A&B&C. Because the physical embodiment's power expenditure occurs proportionally to the each net's toggles, a power profile that accounts for the five actually present toggling nets instead of the four estimated toggling nets is more accurate.

Figure 3B:
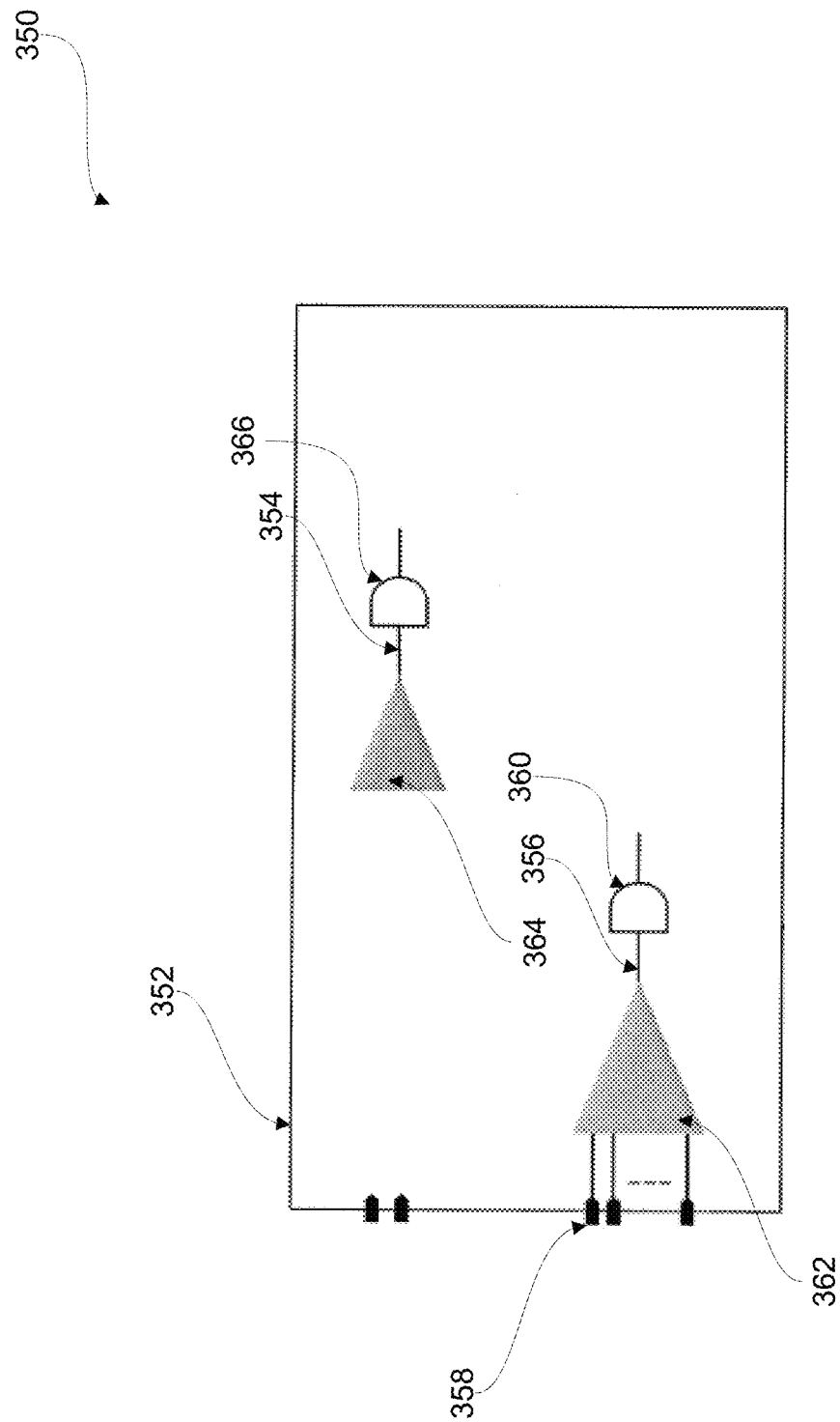
FIG. 3b depicts an exemplary graphic representation of a block of IP in accordance with embodiments of the present disclosure.

FIG. 3b illustrates an exemplary graphic representation 350 of a block of IP 302 in accordance with embodiments of the present disclosure. The graphic representation of block of IP 352 includes a number of nets such as nets 354, 356, a series of inputs 358 and associated logic 362. Net 356 is an interconnection between a collection of logic gates, that are grouped together for the purpose of this graphic illustration as a cone of logic 362, and gate driven gate 360. The cone of logic 362 thus is a representation of all the logic gates that ultimately drive the logic values carried by a waveform on net 356. For example, cone of logic 362 may represent a set of logic gates similar to network 312, in which case net 356 would carry a waveform representing A&B&C. These gates may for example be separately instantiated in a netlist associated with the block of IP 352. Net 356 also serves as an input into gate 360, which is referred to as the driven gate, driven by net 356, and the cone of logic includes the driving gate that drives the logic values carried on net 356. Similarly net 354 is driven by one or more logic gates represented here by cone of logic 364, and drives logic gate 366, but in this example net 354 is an empty net. Net 354 may be an empty net (i.e. has no associated toggle simulation data) because when the simulation data was generated, net 354 may not have been observed during simulation, or because net 354 is an inferred net, e.g. an inferred net associated with one or more logic gates represented by the cone of logic 362. Net 356 may instead be a populated net, meaning that 356 has associated toggle simulation data, for example as a result of a simulation having been run in which net 356 was identified for observation. This toggle simulation data may be stored in any suitable manner, such as in a database, or a file, as long as it is later accessible and able to be associated with net 356 for the purposes of generating a power profile of IP block 350.

Referring to FIG. 1, the block of IP 350 may be described in part by a netlist, similar to IP Block 104, which includes netlist 110. As described in reference to FIG. 1, Net1 and Net3 have associated toggle data TG1 and TG3 in toggle simulation data 114, while Net2 is an empty net. Similarly, net 356 has associated toggle simulation data like Net1 in netlist 110; while net 354 is an empty net like Net2 in netlist 110. In each case, whether an empty net like net 354, or a populated net like net 356, every net will have an associated weight, or net weight, similar to the nets of netlist 110 have associated weights 112. As described above, a net weight is proportional to the capacitance, or the effective capacitance, of the net itself and the gates connected to the net.

Figure 4:
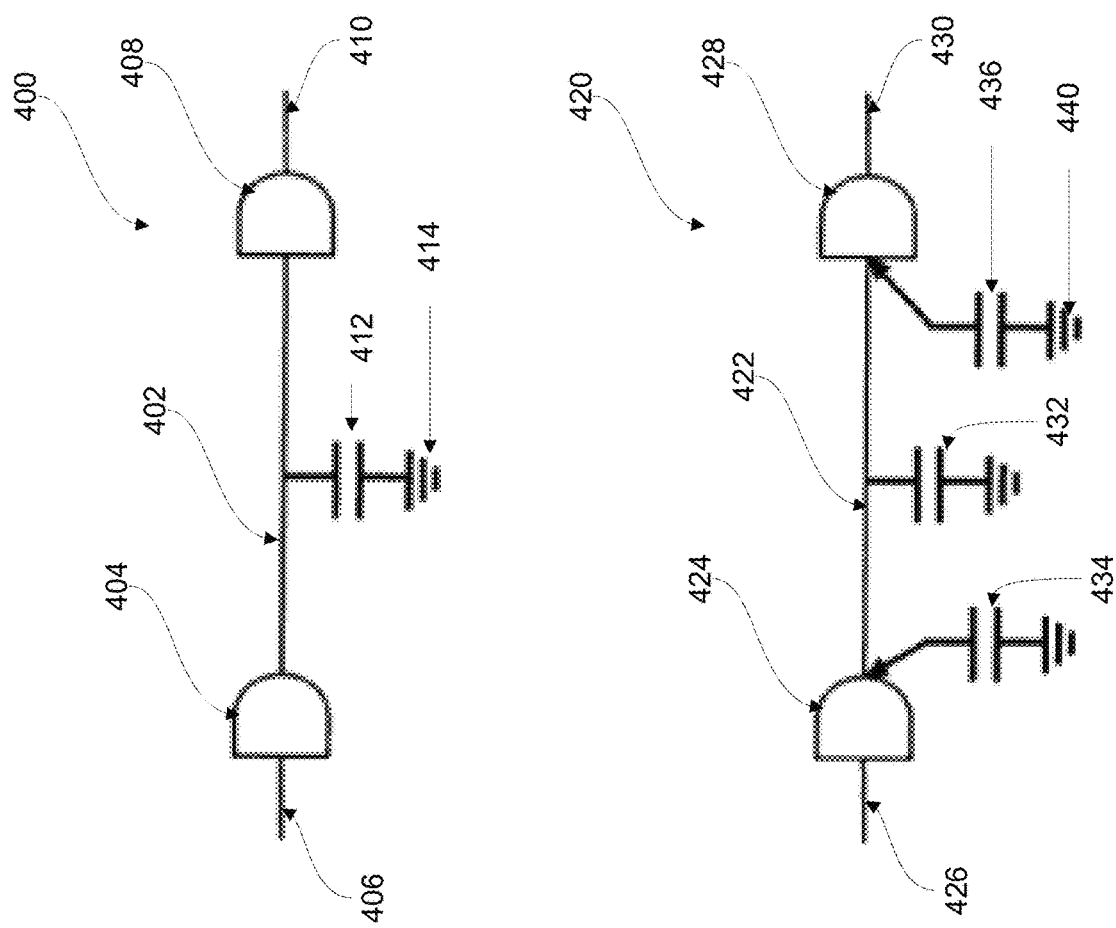
FIG. 4 depicts exemplary modeling techniques in accordance with embodiments of the present disclosure.

FIG. 4 illustrates two techniques for generating an effective load capacitance for generating a net weight. The first technique is described with respect to circuit 400. Circuit 400 includes an input line 406, a toggling gate 404, a line 402 and a toggled gate 408 having an output line 410, in this case the net under consideration refers to line 402. The first technique employs a net load equivalent capacitance 412 to ground 414, and it is this capacitance 412 that is used to estimate power expended during operation, because the energy expended when net 402 is toggled is proportional to the effective capacitance. This toggling may be simulated by, e.g., applying input data to input 406 in order to simulate the behavior of the waveforms on net 402 and if desired output 410. This output from net 402 is the associated toggle data. And, the weight given to each toggle in the associated toggle data is proportional to the effective capacitance 412.

In a preferred embodiment, a second technique is employed. The second technique is described with respect to circuit 420. circuit 420 includes an input line 426, a toggling gate 424, a line 422 (the observed net in this example), and a toggled gate 428 having an output line 430. The second technique determines the effective capacitance based on a gate load capacitance 432 to ground 440 as in the first technique, but also employs a driving capacitance 434 associated with the output of the toggling, or driving, gate 424 and the input capacitance 436 of the driven gate 428. It is appreciated that a toggling gate may have a fanout of greater than one, resulting in multiple driven gates, and thus additional driven capacitance factors. This second technique described in relation to net 420 provides a more accurate power profile of a particular net over the first technique described above. These effective load capacitances, whether generated based on the first technique or the second technique described above, may be utilized to generate or set the weighting values of each net within a netlist, e.g. 110, within a block of IP, e.g. 104.

Having the net weights, and the simulated toggle data for a sampling of the nets in a netlist, one calculates $E_S$ as discussed above for those nets in the sampling of nets. In this way, $E_N$ is obtained as described above using the ratio $K_S$, and a power profile can be generated for a block of IP. But, because the system must be able to generate an accurate power profile for a collection if blocks of IP, e.g. a collection describing a unit or electrical circuit, the system must also be able to handle the case where no nets have associated toggle data in a particular block of IP, e.g., block of IP 120.

Figure 5:
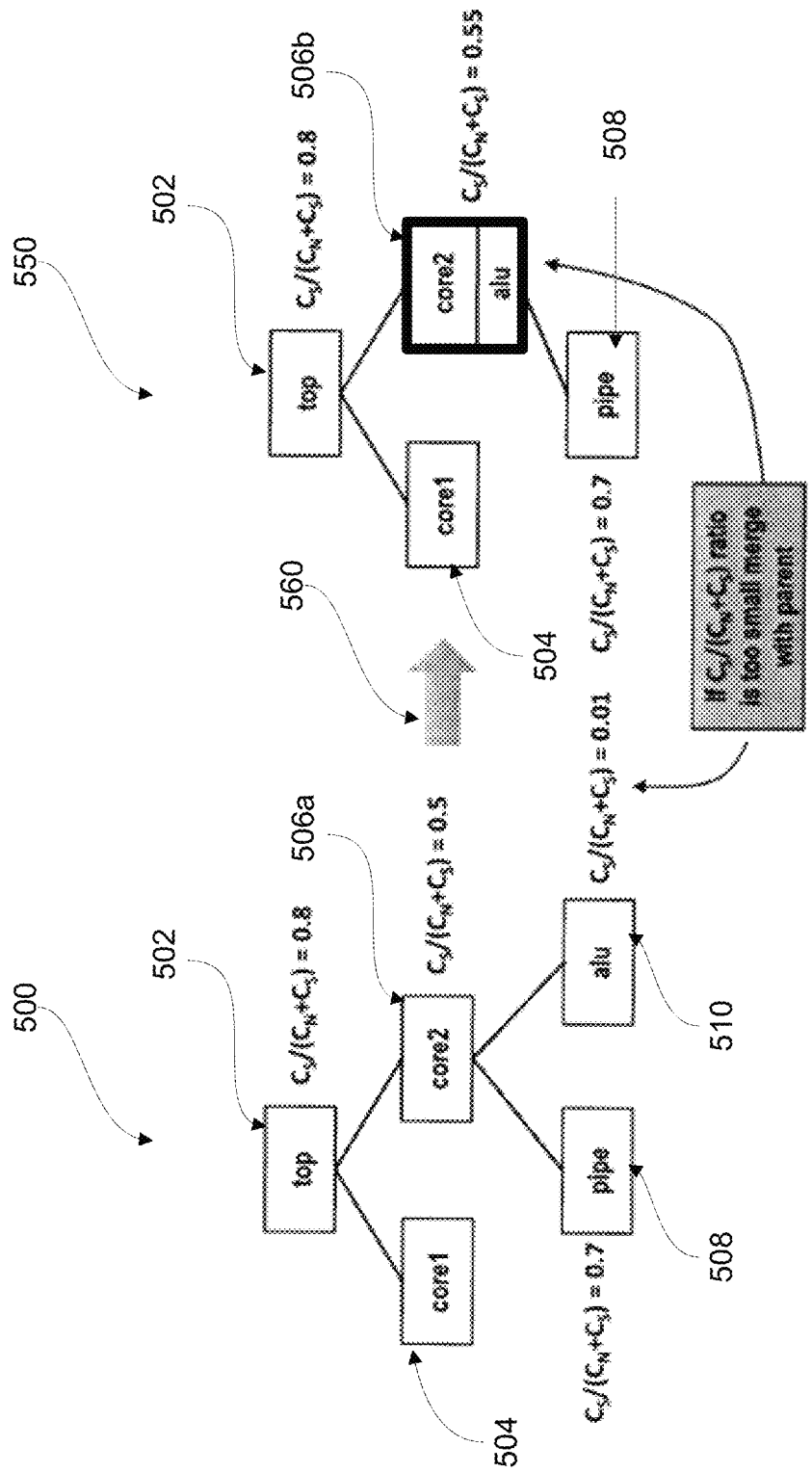
FIG. 5 depicts an exemplary transform of a hierarchically organized unit in accordance with embodiments of the present disclosure.

FIG. 5 illustrates an exemplary transform of a hierarchically organized unit in accordance with embodiments of the present disclosure allowing for an accurate power profile for a unit comprising multiple IP blocks, including IP blocks only containing empty nets such as block of IP 120. Unit 500 comprises the following IP blocks: a top IP block 502, a core1 IP block 504, a core2 IP block 506a, a pipe block 508, and a arithmetic log unit (ALU) block 510. The IP blocks of unit 500 are organized in a hierarchical structure of parent-child relationships. Top IP block 502 is parent to child blocks: core1 504 and core2 506a. Similarly core2 506a, while being a child block to top IP block 502, is also a parent block to two child blocks pipe 508 and ALU 510. If a block has insufficient nets with associated toggle simulation data, e.g. only empty nets, or a ratio of empty nets to total nets that is too small, a transform 560 is applied to structure 502 to obtain IP blocks having sufficient sampled nets (i.e. nets with sufficient toggle simulation data). During transform 560, child IP blocks comprising only empty nets or comprising an insufficient number of nets having toggle simulation data, are merged with their parent IP block and treated as a single block for the purposes of generating $E_N$. In embodiments, an IP block having less than 10% of nets with toggle data is considered too small, and is thus merged with its parent block. In other embodiments, an IP block having less than 15% of nets with toggle data is considered too small to be reliable. This threshold may vary depending on design demands and the accuracy demanded by the profile.

Thus, the result of transform 560 is hierarchical data structure 550 which includes IP blocks 502, 504, and 508, but differs from structure 500 insofar as 506b replaces 506a and 510, because transform 560 causes IP block 510 to merge with IP block 506a to form 506b for the purpose of generating the power profile. As a general matter, in embodiments, transform 560 is accomplished by a depth first traversal of the hierarchy that upon identifying a block having insufficient, or no, simulation data, merges the identified block (e.g. 510) into its parent block (e.g. 506a) to form a merged block (506b), and then continues the depth first traversal. Should a merged parent and child block still have too few nets with associated toggle data, that merged block is also merged with its parent block, and so on. A second depth first traversal may then propagate the net ratios from upper level blocks to lower level blocks. In this way, a power profile block having a few nets with associated toggle data may generate a power profile based on the propagated ratio. This also accelerates later simulations relying on the child block by simplifying a later net look up operations. By performing the merging and propagation in a hierarchical manner as described herein, correlations of activity and function between parent and child blocks are reflected in the resulting power profile thereby improving accuracy.

Figure 6:
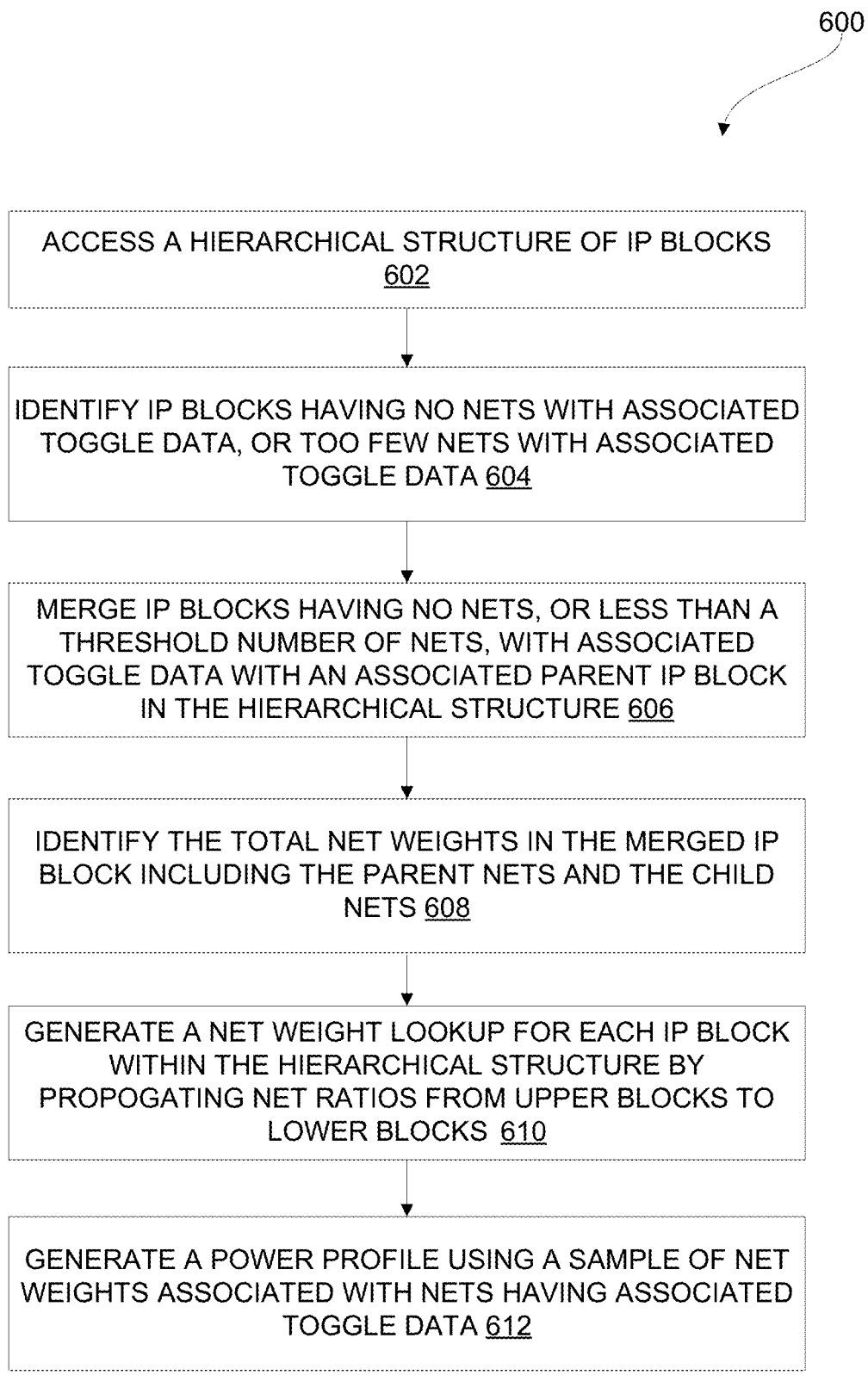
FIG. 6 is a flow chart depicting operations of an exemplary method for generating a power profile of an electronics design in accordance with embodiments of the present disclosure.

FIG. 6 illustrates a flowchart 600 depicting operations of an example method for generating a power profile of a electronic device design. At operation 602 a hierarchical structure of IP blocks is accessed, for example by software 106 carrying out analysis module 122. Then, at operation 604, IP blocks having no nets, or insufficient nets, with associated toggle simulation data are identified. At operation 606, IP blocks having no nets with sufficient associated toggle simulation data are merged with a parent IP block within the hierarchical structure. In embodiments, at operation 606, alternatively IP Blocks having some nets with associated toggle simulation data, but less than a threshold amount (e.g. less than 10% or 15% of nets are populated with associated toggle simulation data) are merged with a parent IP block within the hierarchical structure. Where the resulting merged parent/child IP block still has insufficient associated toggle simulation data, this operation may be repeated recursively until a merged block with sufficient toggle data results. At operation 608, the total net weights in the merged block, including the parent nets and the child nets, are identified. Then at operation 610, a net weight lookup for each IP block within the merged hierarchical structure is generated and may be propagated from upper blocks to lower blocks. Then at operation 612, a power profile is generated using a sample of net weights associated with parent nets having associated toggle data. In embodiments, the sample of net weights are obtained from the net weight lookup. In other embodiments, a power profile may be generated directly based on derived, or on propagated, net weights.

The techniques, systems, and processes described above provide many technical advantages. The improvements to electronic design simulations and profiling described above can be employed to test and fabricate electronic circuits, non-limiting examples of which are integrated circuits, power circuits, power electronic circuits, PCB board analysis and so on. The techniques, systems, and processes described are useful for generating and verifying design specifications, and also modeling systems responses to experimental physical data. Design specifications can be embodied in various reusable blocks of IP, which the systems and methods herein take as inputs in order generate outputs in the form of models of real world responses. These techniques are also useful for gathering physical data about a physical electric circuit, which may also be expressed in blocks of reusable IP, that may be repeatedly reused in order to perform modeling based on that physical data. With the ability to accurately model a electronic circuit and its response to physical data, the design of the electronic circuit can be deterministically and predictably modified to tailor the electronic circuit according to design specifications. The tailored electronic circuit may also be described as a unit of multiple blocks of reusable IP. These reusable blocks of IP may then be employed by other fabrication control systems in order to fabricate and generate physical embodiments of the reusable IP.

Figure 7A:
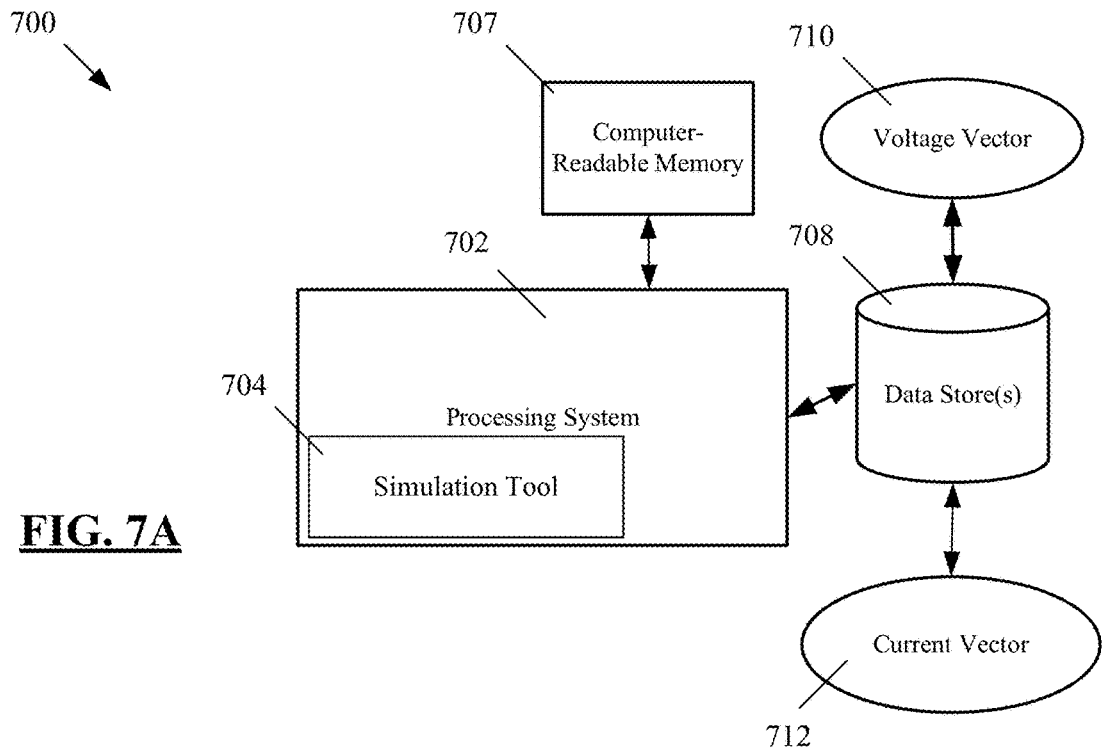
FIGS. 7A, 7B, and 7C depict example systems for implementing the techniques described herein.
Figure 7B:
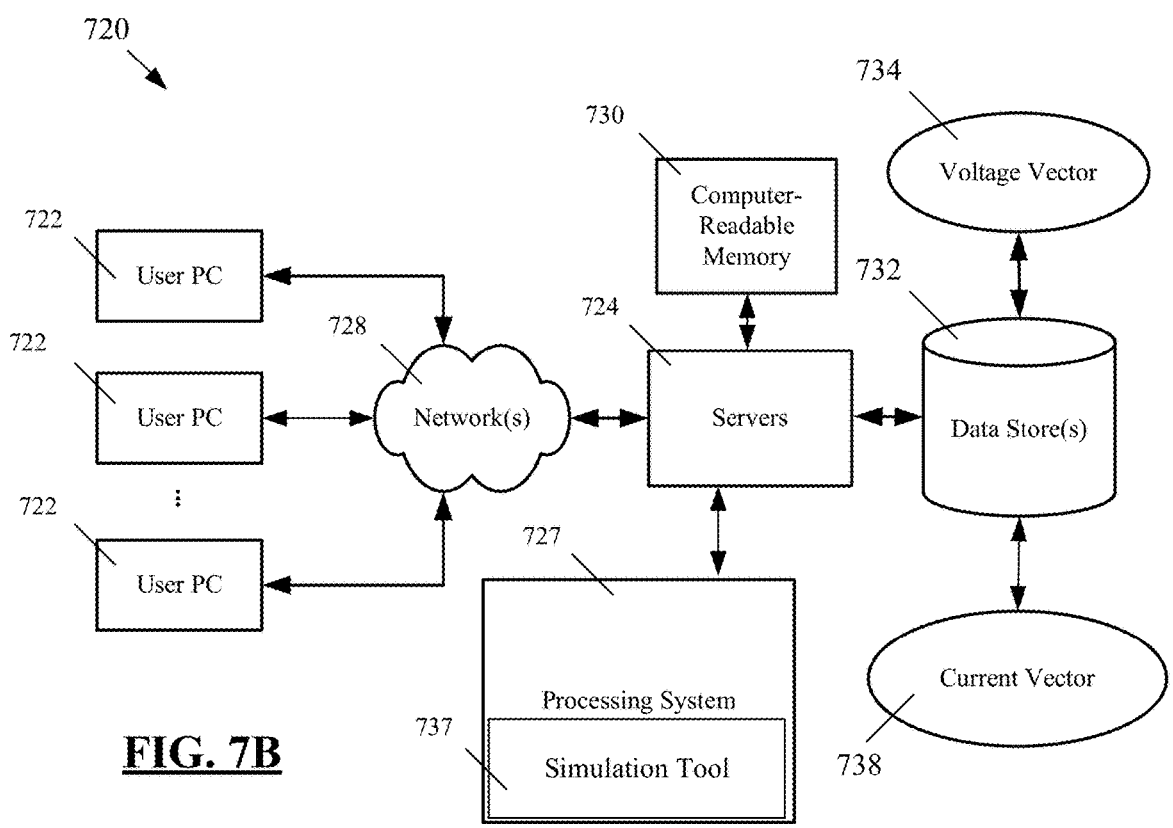
Figure 7C:
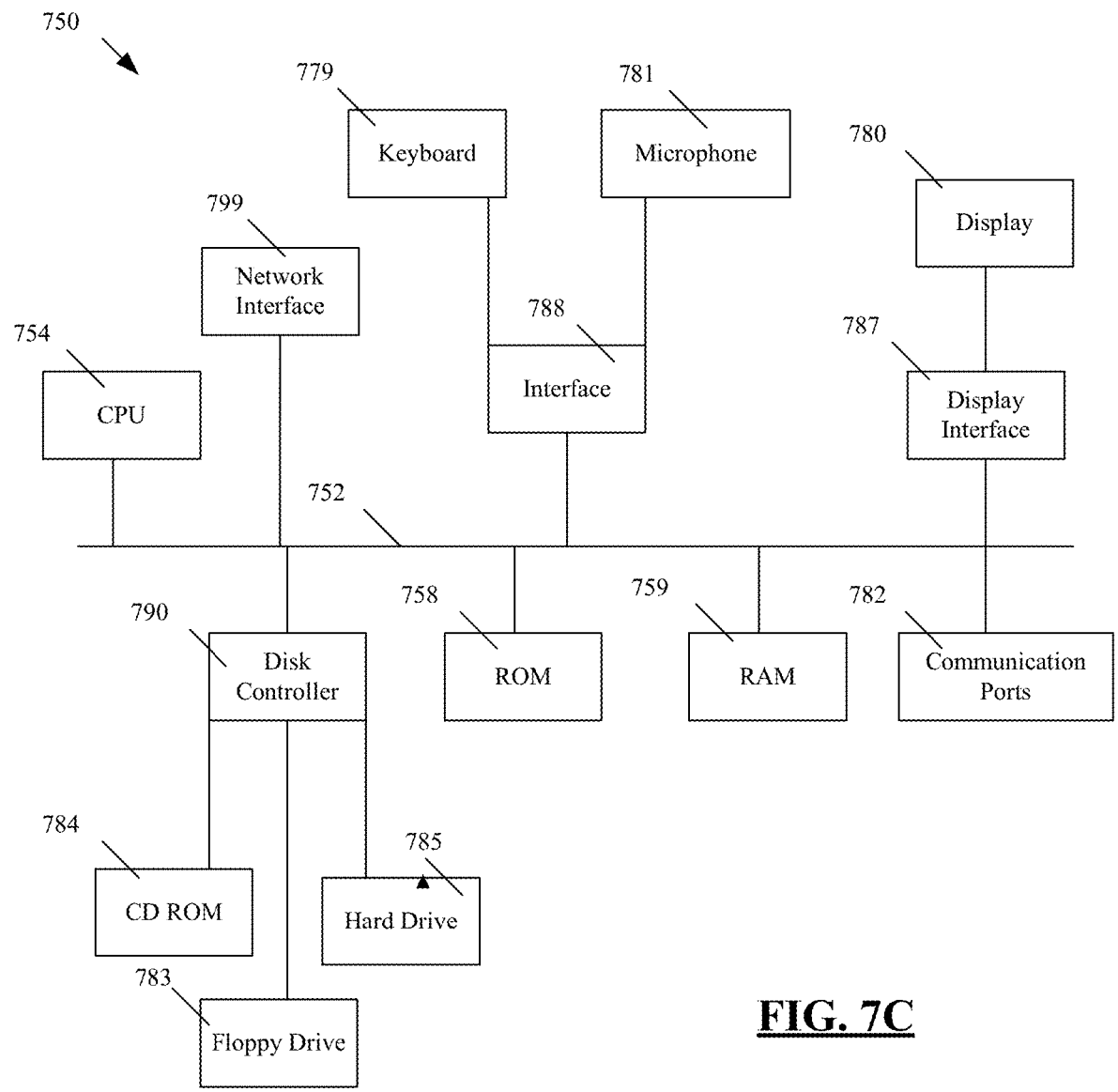

In FIGS. 7A, 7B, and 7C, computer readable memories 707, 730, 758, 759 or data stores 708, 732, 783, 784 may include one or more data structures for storing and associating various data used in the example systems described herein. For example, a data structure stored in any of the aforementioned locations may be used to store current vectors and voltage vectors. A disk controller 790 interfaces one or more optional disk drives to the system bus 752. These disk drives may be external or internal floppy disk drives such as 783, external or internal CD-ROM, CD-R, CD-RW or DVD drives such as 784, or external or internal hard drives 785. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 790, the ROM 758 and/or the RAM 759. The processor 754 may access one or more components as required.

A display interface 787 may permit information from the bus 752 to be displayed on a display 780 in audio, graphic, or alphanumeric format. Communication with external devices may optionally occur using various communication ports 782.

In addition to these computer-type components, the hardware may also include data input devices, such as a keyboard 779, or other input device 781, such as a microphone, remote control, pointer, mouse and/or joystick. Such data input devices communicate with the standalone computer architecture 750 via an interface 788, in some embodiments.

The standalone computer architecture 750 further includes a network interface 799 that enables the architecture 750 to connect to a network, such as a network of the one or more networks 728.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, C#, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

One or more aspects or features of the subject matter described herein can be realized in digital electronic circuitry, integrated circuitry, specially designed application specific integrated circuits (ASICS), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

It is claimed:

1. A computer implemented method for more efficiently generating a power profile for an electronics design without measuring an energy expenditure for empty nets, the computer-implemented method comprising:
   accessing a unit descriptive of an electronic circuit design, said unit comprising a of the electronic circuit design;

identifying net weights in the netlist, wherein each respective net weight is proportional to an effective load capacitance of an associated net in the netlist;

identifying populated nets in the netlist, each populated net having associated toggle simulation data and an associated net weight;

identifying one or more empty nets that are associated with no toggle simulation data;

generating a ratio ($K_S$) between a sum of the net weights and a sum of all the net weights for the populated nets;

generating a sample energy ($E_S$) based on associated toggle simulation data of each populated net and further based on the net weights associated with the populated nets; and modeling a block power profile of the netlist solely based on $K_S$ multiplied by $E_S$.

2. The computer implemented method of claim 1, wherein the effective load capacitance for each respective net weight comprises:

an effective capacitance of the respective populated net;
an effective capacitance of a driving gate;
an effective capacitance of one or more driven gates.

3. The computer implemented method of claim 2, wherein the unit comprises a first intellectual property (IP) block expressed in a simulation language and a second IP block including a second netlist having only net weights without any associated toggle simulation data, the first IP block and the second IP block having a hierarchical relationship such that the first IP block is a parent block to the second IP block, the second IP block having a child relationship to the first IP block, the method further comprising:

merging the second IP block with the first IP block,
wherein the step of identifying the net weights in the netlists includes the-net weights without associated toggle simulation data of the second IP block.

4. The computer implemented method of claim 3, wherein modeling a block power profile includes modeling a first block of IP power profile and a second block of IP power profile based on the generated ratio $K_S$.

5. The computer implemented method of claim 1, wherein the unit comprises more than two intellectual property (IP) blocks all related through a hierarchical relationship, wherein the more than two IP blocks include the first IP block, the method further comprising:

traversing the hierarchy to identify any of the more than two IP blocks having no nets with associated toggle data or having insufficient nets with associated toggle data, and merging any of the more than two IP blocks having no nets with associated toggle data or insufficient nets with associated toggle data with a parent IP block within the hierarchical relationship to form a merged block, wherein identifying the net weights in the netlist includes nets without associated toggle data in all of the more than two IP blocks merged with the first IP block; and wherein modeling a block of power profile includes modeling a respective power profile based on the generated ratio $K_S$ for the merged block or modeling a respective power profile based on the generated ratio $K_S$ for each individual net having insufficient nets with associated toggle data.

6. The computer implemented method of claim 1, wherein the unit comprises a first intellectual property (IP) block expressed in a simulation language, wherein the simulation language is a hardware description language and the netlist is generated from the hardware description language expression of the first block of IP, and further wherein the associated simulated toggle data of each of the populated nets is generated using a logic simulator configured to observe the state of each of the populated nets during simulation.

7. The computer implemented method of claim 1, wherein each net weight in the netlist is associated with one of a plurality of nets, the method comprising:

evaluating each of nets against a database comprising stored toggle simulation data, wherein each net is associated with one of the net weights;

when a first evaluated net of the nets is not associated the stored toggle simulation data, incorporating the value of a first evaluated net weight associated with the first evaluated net in the sum of all net weights; and when a second evaluated net of the nets is associated with the stored toggle simulation data, incorporating the value of the second evaluated net weight associated with the second evaluated net in the sum of all populated net weights and the sum of all net weights.

8. A computer program product for more efficiently generating a power profile for an electronics design without measuring an energy expenditure for empty nets, the computer program product comprising one or more non-transitory computer readable storage media and program instructions stored on the one or more non-transitory computer readable storage media, said program instructions comprising instructions to:

access a unit descriptive of an electronic circuit design, said unit comprising a netlist of the electronic circuit design;

identify net weights in the netlist, wherein each respective net weight is proportional to an effective load capacitance of an associated net in the netlist;

identify populated nets in the netlist, each populated net having associated toggle simulation data and an associated net weight;

identify one or more empty nets that are associated with no toggle simulation data;

generate a ratio ($K_S$) between a sum of the net weights and a sum of all the net weights for the populated nets;

generate a sample energy ($E_S$) based on associated toggle simulation data of each populated net and further based on the net weights associated with the populated nets; and model a block power profile of the netlist solely based on $K_S$ multiplied by $E_S$.

9. The computer program product of claim 8, wherein the effective load capacitance for each respective net weight comprises:

an effective capacitance of the respective populated net;
an effective capacitance of a driving gate;
an effective capacitance of one or more driven gates.

10. The computer program product of claim 9, wherein the unit comprises a first intellectual property (IP) block expressed in a simulation language and a second IP block including a second netlist having only net weights without any associated toggle simulation data, the first IP block and the second IP block having a hierarchical relationship such that the first IP block is a parent block to the second IP block, the second IP block having a child relationship to the first IP block, the method further comprising:

merging the second IP block with the first IP block,
wherein the step of identifying the net weights in the netlists includes the net weights without associated toggle simulation data of the second IP block.

11. The computer program product of claim 10, wherein modeling a block power profile includes modeling a first block of IP power profile and a second block of IP power profile based on the generated ratio $K_S$.

12. The computer program product of claim 8, wherein the unit comprises more than two intellectual property (IP) blocks all related through a hierarchical relationship, wherein the more than two IP blocks include the first IP block, said program instructions further comprising instructions to:
    traverse the hierarchy to identify any of the more than two IP blocks having no nets with associated toggle data or having insufficient nets with associated toggle data, and
    merge any of the more than two IP blocks having no nets with associated toggle data or insufficient nets with associated toggle data with a parent IP block within the hierarchical relationship to form a merged block,
    wherein identifying the net weights in the netlist includes nets without associated toggle data in all of the more than two IP blocks merged with the first IP block; and
    wherein modeling a block of power profile includes modeling a respective power profile based on the generated ratio $K_S$ for the merged block or modeling a respective power profile based on the generated ratio $K_S$ for each individual net having insufficient nets with associated toggle data.

13. The computer program product of claim 8, wherein the unit comprises a first intellectual property (IP) block expressed in a simulation language, wherein the simulation language is a hardware description language and the netlist is generated from the hardware description language expression of the first block of IP, and further wherein the associated simulated toggle data of each of the populated nets is generated using a logic simulator configured to observe the state of each of the populated nets during simulation.

14. The computer program product of claim 7, wherein each net weight in the netlist is associated with one of a plurality of nets, said program instructions further comprising instructions to:
    evaluate each of nets against a database comprising stored toggle simulation data, wherein each net is associated with one of the net weights;
    when a first evaluated net of the nets is not associated the stored toggle simulation data, incorporating the value of a first evaluated net weight associated with the first evaluated net in the sum of all net weights; and
    when a second evaluated net of the nets is associated with the stored toggle simulation data, incorporating the value of the second evaluated net weight associated with the second evaluated net in the sum of all populated net weights and the sum of all net weights.

15. A system for more efficiently generating a power profile for an electronics design without measuring an energy expenditure for empty nets, the system comprising:
    at least one processor including one or more processor cores executing on or more threads in a computing system and a non-transitory computer accessible storage medium storing thereupon program code that includes a sequence of instructions that, when executed by the at least one processor, causes the at least one processor at least to:
    access a unit descriptive of an electronic circuit design, said unit comprising a netlist of the electronic circuit design;
    identify net weights in the netlist, wherein each respective net weight is proportional to an effective load capacitance of an associated net in the netlist;
    identify populated nets in the netlist, each populated net having associated toggle simulation data and an associated net weight;
    identify one or more empty nets that are associated with no toggle simulation data;
    generate a ratio ($K_S$) between a sum of the net weights and a sum of all the net weights for the populated nets;
    generate a sample energy ($E_S$) based on associated toggle simulation data of each populated net and further based on the net weights associated with the populated nets; and
    model a block power profile of the netlist solely based on $K_S$ multiplied by $E_S$.

16. The system of claim 15, wherein the effective load capacitance for each respective net weight comprises:
    an effective capacitance of the respective populated net;
    an effective capacitance of a driving gate;
    an effective capacitance of one or more driven gates.

17. The system of 16, wherein the unit comprises a first intellectual property (IP) block expressed in a simulation language and a second IP block including a second netlist having only net weights without any associated toggle simulation data, the first IP block and the second IP block having a hierarchical relationship such that the first IP block is a parent block to the second IP block, the second IP block having a child relationship to the first IP block, and the instructions that, when executed by the at least one processor, further causes the at least one processor at least to:
    merge the second IP block with the first IP block,
    wherein the step of identifying the $N_T$ net weights in the netlists includes net weights without associated toggle simulation data of the second IP block.

18. The system of claim 17, wherein modeling a block power profile includes modeling a first block of IP power profile and a second block of IP power profile based on the generated ratio $K_S$.

19. The system of claim 15, wherein the unit comprises more than two intellectual property (IP) blocks all related through a hierarchical relationship, wherein the more than two IP blocks include the first IP block, and the instructions that, when executed by the at least one processor, further causes the at least one processor at least to:
    traverse the hierarchy to identify any of the more than two IP blocks having no nets with associated toggle data or having insufficient nets with associated toggle data, and
    merge any of the more than two IP blocks having no nets with associated toggle data or insufficient nets with associated toggle data with a parent IP block within the hierarchical relationship to form a merged block,
    wherein identifying the net weights in the netlist includes nets without associated toggle data in all of the more than two IP blocks merged with the first IP block; and
    wherein modeling a block of power profile includes modeling a respective power profile based on the generated ratio $K_S$ for the merged block or modeling a respective power profile based on the generated ratio $K_S$ for each individual net having insufficient nets with associated toggle data.

20. The system of claim 15, wherein the unit comprises a first intellectual property (IP) block expressed in a simulation language, wherein the simulation language is a hardware description language and the netlist is generated from the hardware description language expression of the first block of IP, and further wherein the associated simulated toggle data of each of the populated nets is generated using a logic simulator configured to observe the state of each of the populated nets during simulation.

21. The system of claim 15, wherein each net weight in the netlist is associated with one of a plurality of nets, and the instructions that, when executed by the at least one processor, further causes the at least one processor at least to:
- evaluate each of nets against a database comprising stored toggle simulation data, wherein each net is associated with one of the $N_T$ net weights;
- when a first evaluated net of the nets is not associated the stored toggle simulation data, incorporating the value of a first evaluated net weight associated with the first evaluated net in the sum of all net weights; and
- when a second evaluated net of the nets is associated with the stored toggle simulation data, incorporating the value of the second evaluated net weight associated with the second evaluated net in the sum of all populated net weights and the sum of all net weights.

* * * * *